United States Patent [19]

Richter

[11] Patent Number: 4,678,081
[45] Date of Patent: Jul. 7, 1987

[54] MAGAZINE FOR RECORDING TAPE CASSETTES

[75] Inventor: Herbert Richter, Pforzheim-Bue, Fed. Rep. of Germany

[73] Assignee: Herbert Richter, Metallwaren-Apparatebau GmbH & Co., Pforzheim-Bue, Fed. Rep. of Germany

[21] Appl. No.: 808,603

[22] Filed: Dec. 13, 1985

[30] Foreign Application Priority Data

Sep. 11, 1985 [EP] European Pat. Off. ........ 85111504.8

[51] Int. Cl.⁴ .............................................. B65D 85/67
[52] U.S. Cl. .................................... 206/387; 206/504; 312/8; 312/10
[58] Field of Search ............... 206/387, 449, 455, 504; 312/8, 10, 15, 330 R, 332, 338, 9, 12

[56] References Cited

U.S. PATENT DOCUMENTS

| | | | |
|---|---|---|---|
| 3,760,937 | 9/1973 | Van Wyngarden et al. | 206/387 |
| 3,946,865 | 3/1976 | Bierwas | 312/15 |
| 3,994,550 | 11/1976 | Ackeret | 206/387 |
| 4,030,601 | 6/1977 | Ackeret | 206/387 |
| 4,087,145 | 5/1978 | Weavers | 206/387 |
| 4,196,806 | 4/1980 | Posso | 206/387 |
| 4,240,551 | 12/1980 | Osanai | 206/387 |
| 4,266,834 | 5/1981 | Ackeret | 206/387 |
| 4,285,554 | 8/1981 | Bell et al. | 312/10 |
| 4,293,075 | 10/1981 | Veralrud | 206/387 |
| 4,365,713 | 12/1982 | Ekuan | 206/387 |
| 4,406,369 | 9/1983 | Wallace et al. | 206/387 |
| 4,440,299 | 4/1984 | Peinecke | 312/15 |

FOREIGN PATENT DOCUMENTS

| | | | |
|---|---|---|---|
| 1169389 | 6/1984 | Canada | 206/387 |
| 2033388 | 5/1973 | Fed. Rep. of Germany . | |

Primary Examiner—Joseph Man-Fu Moy

[57] ABSTRACT

A magazine for recording tape cassettes for use in vehicles has a plurality of chambers, each for the reception of a cassette and each having an opening corresponding to the cassette's smallest cross-section. The chambers have cantilevered spring leaves arranged at their top walls which leaves carry locking members including plates with cam-like edges projecting downwardly so as to engage the hub openings of the cassette reels to lock the reels and retain the cassettes in the chambers and to force them against their bottom support. The chambers further have resilient guide straps disposed at one of their sides so as to project into the chambers and engage and force the cassettes therein into firm engagement with the opposite chamber side walls, all chambers being formed by drawer-like building elements stacked on top of one another and compressed within the magazine housing.

11 Claims, 8 Drawing Figures

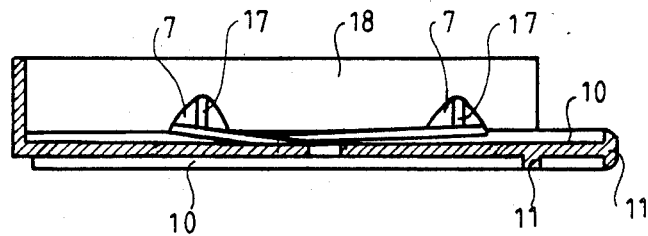
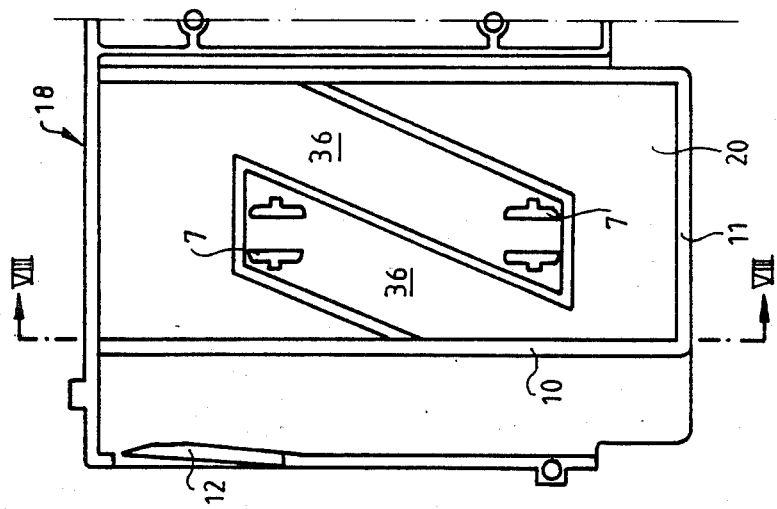

MAGAZINE FOR RECORDING TAPE CASSETTES

BACKGROUND OF THE INVENTION

The invention relates to a magazine for tape recording cassettes especially for use in automobiles which magazine has arranged in a housing a plurality of chambers each for the reception of a recording tape cassette and locking members are associated with the chambers and adapted to project into the center openings of the reels in the cassettes for locking the reels.

A magazine of this type is described in German Pat. No. 2,033,388. In this magazine the chambers are oriented vertically and have at their sides angled spring loaded members which are moved into the chambers against the spring force when tape cassettes are inserted into the chambers. Movement of the angled members into the chambers causes locking members adapted in shape to the reel hub opening and mounted on leaf springs to be moved into the reel hub openings as the leaf springs are engaged and flexed by cams arranged on the chamber side walls. The reels are then locked in position and cannot rotate even during strong vibrations as they occur in automobiles.

At the bottom side of each chamber there is provided an additional locking member which is also mounted on a leaf spring and adapted to project into a cassette's opening provided at its long narrow side (cassette window). By this structure in combination with a backup member on the top of the chamber the cassette itself is fixed in position in a chamber so that it will not accidentally fall out of the chamber.

The arrangement according to the above patent is safe as far as the retaining of the cassettes and the locking of the cassette reels are concerned but the manufacture of such magazines is relatively expensive. In addition the tape is contacted by the locking member projecting into the cassette window and slightly forced inwardly together with the tape's resilient player head engagement mechanism which results in an undesirable tape load. Also, the vertical orientation of the tapes makes it necessary to always turn a cassette when it is taken out of the magazine and inserted into the player.

It is the object of the present invention to provide a cassette magazine which:
1. securely retains in position the cassettes as well as the reels therein,
2. in contrast to known magazines occupies relatively little space,
3. protects the cassettes from dust and from mechanical damage,
4. may be mounted on a vehicle in a simple manner, and
5. finally can be manufactured in an economical manner.

SUMMARY OF THE INVENTION

These objects are achieved by a magazine for tape cassettes which has a plurality of chambers, one for each cassette, into which the cassettes may be inserted through openings which correspond in cross-section to a tape cassette's narrow side cross-section. The chambers are formed by drawer-like building elements stacked on top of one another and compressed within the magazine housing. At the top of the chambers there are provided cantilevered spring leaves carrying at their free ends locking members projecting downwardly and having plates with cam-like edges adapted to slide over a cassette when the cassette is inserted into a chamber and to snap into the hub openings of the cassette reels to engage and lock the reels and to retain the cassette in the chamber and force it against its bottom support. The chambers further have resilient guide strips disposed at one of their sides so as to project into the chambers and engage any cassettes therein and force them into firm engagement with the opposite chamber side walls thereby firmly preventing rattling of the cassettes when inserted into the chambers.

In this arrangement the locking members are not in the form of pegs that is they are not shaped so as to fit into the hub openings into which they have to be inserted but they are cam-like such that, mounted on a spring leaf, they will, as a result of their shape, slide along the cassette body when the cassette is inserted into the magazine and finally snap onto the hub openings of the reels.

There is no complicated mechanism for the movement of the reel locking members and the manufacture of the magazine is therefore simplified and substantially less expensive then that of the prior art magazines. Engagement by the especially shaped locking members of the reels also retains the cassettes in their desired position in the magazine, that is it not only prevents rotation of the reels but also the undesired sliding of the cassettes out of the magazine chambers. Retention of the cassette is further improved by guide strips which abut the cassettes at their narrow ends. In contrast to known arrangements however the guide strips engage the cassettes not at the cassette surfaces which have the tape openings but only at the closed narrow side surface areas.

It is further noted that, with the arrangement according to the invention, the magazine chambers are arranged horizontally such that also the cassettes disposed therein are in a horizontal position. This has the advantage that the cassettes can be grasped as they are and inserted into the player without tilting movement.

In accordance with the invention the chambers are formed by drawer-like building elements placed on top of one another to form the magazine. This not only permits the set up of a magazine of any desired number of chambers but also provides for extremely economical manufacture.

As a result of such construction and the elimination of any construction elements for the insertion of the locking members into the reel hub openings, the arrangement provides for savings in space which is quite advantageous for such magazines when used in vehicles in which space is generally at a premium.

Elimination of the elements for the insertion of the locking members into the reel hub openings also eliminates any problems that may be caused by their presence and the need for operating them.

Consequently the present invention solves the given objectives, retains the reels in the cassettes and the cassettes within the magazine, the magazine requires little space, the cassettes are protected in the magazine chambers from damage and from dust, and the magazine may be manufactured very economically.

Preferably, the housing and chamber elements consist of plastic and also the leaf springs and the slide strips are formed integrally from the same material.

Because of their horizontal disposition the cassettes are flatly and securely supported on the chamber bottom walls while the reel locking members are resiliently introduced from the top and therefore insure firm engagement of the cassettes with the support floor. This not only fixes the reels in position but also prevents rattling of the cassettes as a result of vehicle vibrations.

Particularly in passenger cars an arrangement with a locking member mounted on a single leaf spring which member engages a reel is usually sufficient for fixing the reel and retaining the cassette. However, in trucks or sporty passenger cars with hard springs it is advisable to lock both reels so as to prevent their rotation. Then two locking members may be mounted on a single spring in accordance with the invention. This may be achieved by a spring strap extending almost over the full length of the cassette which spring strap carries two locking members or by forming a spring finger from a leaf spring which carries a locking member and mounting another locking member on the end of the spring finger. In such an arrangement the two locking members are almost independent of one another so that they can engage the respective reel's hubs independently. Of course the spring finger, instead of being formed from the leaf spring may be independently mounted on a chamber wall and project into a cutout in the leaf spring. It is furthermore possible to provide two leaf springs side-by-side which may be L-shaped or which may be arranged at an acute angle with regard to the longitudinal chamber axis with a locking member connected to the free end of each leaf spring so as to be adapted to engage the reel hubs. One leaf spring may also be connected to the rear end of a cassette chamber and the other to the front end.

The arrangement may be such that one locking member projects downwardly and the other upwardly so that one locking member engages the reel of a cassette below and the other reel of another cassette in the chamber above. It is however preferred that the forces applied by the leaf spring or the spring finger are in support of the gravity forces that is that the cassettes are firmly forced against the bottom. Accordingly, the locking member generally should project into the chamber underneath.

The locking members are provided in order to lock the reels by projecting into the reel hubs and engaging the reels. To this end it is sufficient if the locking members project only far enough to just enter the spaces between the inner hub projections, not beyond. Then engagement movement is minimal and so is the space required per chamber for the reception of a cassette. Taking this into consideration the height of the spring plate to the point where the roof like sections of the locking members are joined is only slightly more than half the height of a cassette and the roof lines of the section are disposed relative to the leaf spring plane at an angle of 50°. The last mentioned feature is derived from experience as it has been found that, with such an angle, the locking members smoothly slide up on the cassettes and still retain the reels and the cassettes once the locking members have snapped into the reel hub openings. Instead of a single spring plate the locking arrangement may utilize two spring plates arranged side-by-side in spaced relationship such that the distance between their outside walls from one another is slightly smaller than the reel hub diameter. Then the projecting portion of the roof like plate structure extends into the reel hubs from the side so that the length of the plate structure is quite short when compared with a single plate structure designed to fill the full reel hub opening.

In order to lock the reel hubs and to retain the cassette safely it is advisable to provide the locking member at least at one outside surface with a shaped section extending normal to the plate structure plane and which is formed corresponding to the reel hub opening.

At their signal pickup (window) side sound tape cassettes have an increased width or thickness. In order to provide for flat support of the cassette with such increased thickness area the chamber walls are provided with slide tracks of a height slightly greater than the projection of the area of increased thickness. In addition, the slide tracks should be so arranged that the window side of the cassette is disposed at the right-hand side of the chamber. Since in most tape players the signal pickup and tape drive structure are arranged at the right, this arrangement has the advantage that the cassettes can be removed from the magazine and inserted into the tape player without being turned.

For economical manufacture of the magazine according to the invention it was found to be advantageous that the drawer-like building elements have two chambers each arranged side-by-side which chambers are separated from one another by a spacing block. Upon stacking of the building elements on top of one another the spacing blocks form a column in the center of the magazine which safely prevents a collapse of the magazine. Furthermore the side sections of the drawer-like building elements and the spacing block are somewhat shorter than the wide planar chamber wall sections. The recess of the side walls and the greater projection of the planar surface sections facilitate the insertion and removal of the cassettes and protect the cassettes from mechanical damage and also from dust deposits. In accordance with the dimensions of a cassette the spacing block may be made to have a width of 10 to 15 mm and the recess provided by the shortened side sections and by the spacing block relative to the planar surface section of the building element may be 15 to 20 mm. It is further advisable that the remaining part of the planar surface section has a width slightly smaller than the short narrow side section of the cassette to be inserted so that the cassette may be easily grasped without interference by the magazine wall.

It has been found especially advantageous that, during assembly of the magazine from a multitude of drawer-like elements, foamed plastic sheets are fitted onto the top, bottom and side walls of the drawer-like elements which are stacked within the magazine housing into which they are compressed between the housing parts. The foam sheets not only provide for thermal protection of any cassettes within the magazine but also prevent or absorb any rattling noises.

Finally it is to be noted that also cassettes disposed in their sales boxes may be inserted into the magazine's chambers if formed accordingly. Then however the locking members may be omitted, the spring straps and slide strips being then directly in contact with such sales boxes to hold them in position.

SHORT DESCRIPTION OF THE DRAWINGS

The figures show schematically various embodiments of the invention. In the drawings:

FIG. 7 shows still another leaf spring structure embodiment; and

FIG. 8 is a cross-sectional view along line VIII—VIII of FIG. 7.

DESCRIPTION OF THE PREFERRED EMBODIMENTS

Figure 1:
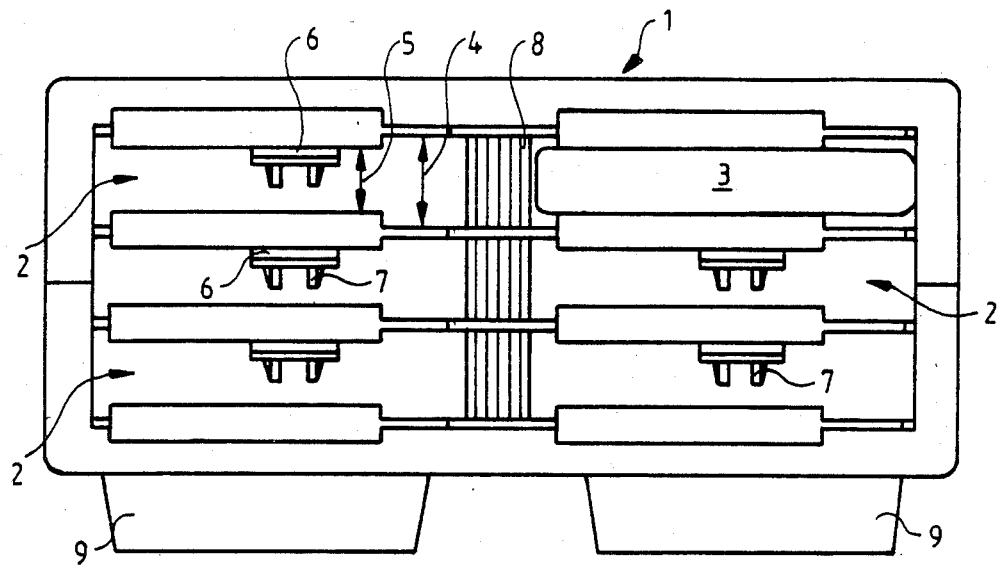
FIG. 1 is a front view of a magazine.

As shown in FIG. 1, a two-piece housing 1 includes horizontal chambers 2 for the reception of sound tape cassettes 3. The chambers 2 are of greater height 4 at their right-hand end than over the remainder of their width. Such difference in height accommodates the bulge provided on a tape cassettes signal pick-up (window) side. At the same time this insures that the cassettes can be inserted into the magazine chambers only in the desired orientation that is with the window on the right so that, when being removed, they are properly positioned and can be inserted into the tape player without the need for turning them. Locking members 7 disposed on a spring leaf 6 project into the chambers 2 from the top such that they are moved upwardly out of the way upon insertion of a cassette 3 and project down into the hub openings of the cassette reels when the cassettes 3 reach their end position. The cassette chambers 2, arranged side-by-side, are separated by a spacing block 8 which has a width of 10 to 15 mm. In order to make sure that only a cassette is grasped and not parts of the magazine, the chamber walls adjacent the cassette's large surface area are slightly recessed at their front corners so that they are slightly shorter than the cassette's short end side. The spacing and the recesses formed in the sidewalls of the chambers facilitate grasping of a cassette 3 at the corners of one end with thumb and index finger so that they can be easily removed from, or inserted into, the magazine. At its underside the magazine housing 1 has wide legs 9 with relatively large support surface areas so as to provide not only for stable support and for sufficient surface area for cementing the housing but also to elevate the housing somewhat thereby facilitating grasping of the cassettes.

Figure 2:
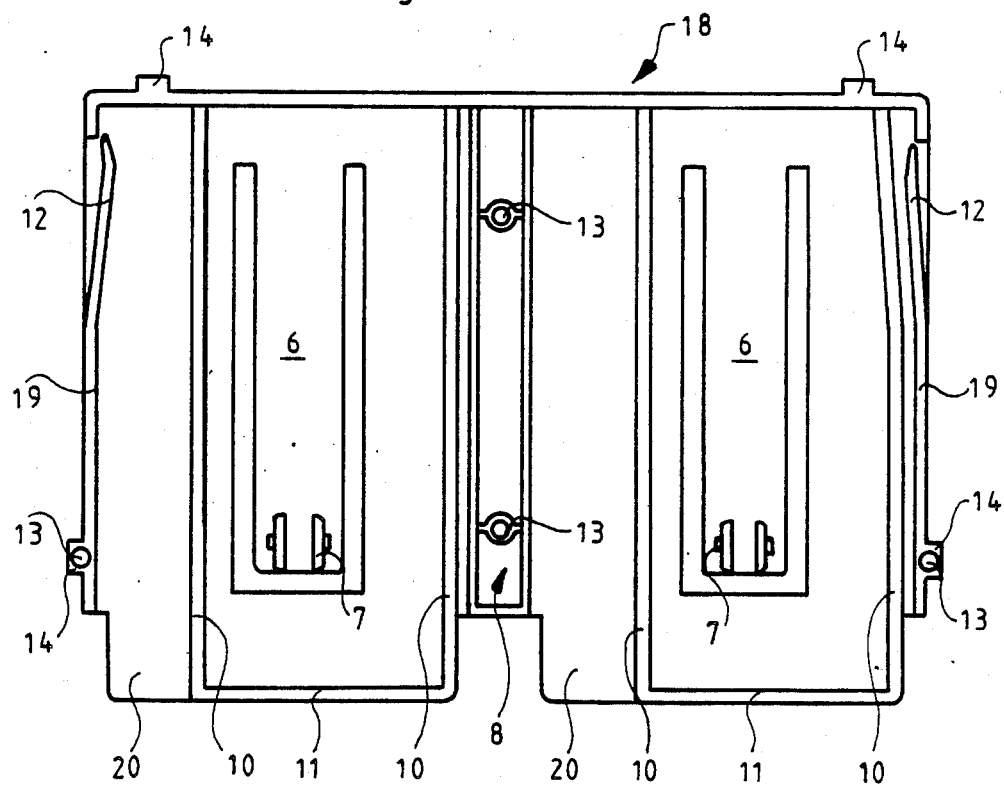
FIG. 2 is a bottom view of a building element.

FIG. 2 is a bottom view of building element 18 for forming a chamber 2. It clearly shows the spring leaves 6 with the locking members 7 disposed thereon and also the spacing block 8. FIG. 2 also shows the slide strips 10 extending over the length of the chamber and so arranged as to accommodate the tape cassette's window bulge. A lateral strip 11 extends across at the front end of the chambers which strip 11 serves to provide for firm support for the cassettes but also to improve the front appearance of the magazine. The slide strips 10/11 not only take the bulged cassette window area into consideration but also provide for the proper freedom of motion for the leaf spring 6 and the locking members 7 associated therewith.

On the outside walls of the drawer-like building elements near the rear end thereof, there are provided rear guide straps 12 which engage the cassettes at their sides when the cassettes are fully inserted and firmly locate the cassettes by forcing them in engagement with the opposite chamber wall thereby preventing rattling of the cassettes. FIG. 2 also shows openings 13 adapted to receive opposite pins projecting from the building element below to facilitate accurate stacking of the drawer-like building elements. At their side ends the building elements have projections 14 formed thereon which provide for a clearance between the building elements and the magazine housing walls for the reception of foam sheets compressed within the housing for thermal protection and noise suppression.

A cassette 3 can be inserted into the chambers 2 only in its proper orientation that is with its window area at the right where the greater height 4 of the chamber 2 permits it. When the cassette 3 is inserted the locking member 7 mounted on the spring leaf 6 is moved upwardly out of the way, slides onto the cassette body and finally snaps into the hub opening of the first or forward reel of the cassette. When the locking member 7 is engaged, it prevents rotation of the reel and together with the guide strap 12, retains the cassette and locates it within the magazine. The insertion of the cassette and its removal is relatively easily possible because of the space provided between the adjacent chambers by the spacing blocks 8 which permits grasping of the cassettes with thumb and index finger. It is also noted that the cassette 3 projects slightly from a chamber at both sides so that only the cassette can be firmly grasped without interference by the chamber walls or the magazine housing. When a cassette is inserted into a chamber it is disposed, already by its weight, on the slide strips 10, 11 arranged in the chambers. In addition however, the cassette is loaded by the force of the leaf spring 6 acting also downwardly so that, by cooperation of gravity and the force of spring 6 and also by engagement of the resilient guide strap 12, the cassette is sagely engaged and rattling of the cassette within a chamber 2 of the magazine is firmly prevented. If during extreme vibrational movements the cassettes should be subjected to same movement in spite of the spring forces applied to it, any noises generated thereby would be dampened by the surrounding foam sheets.

Figure 3:
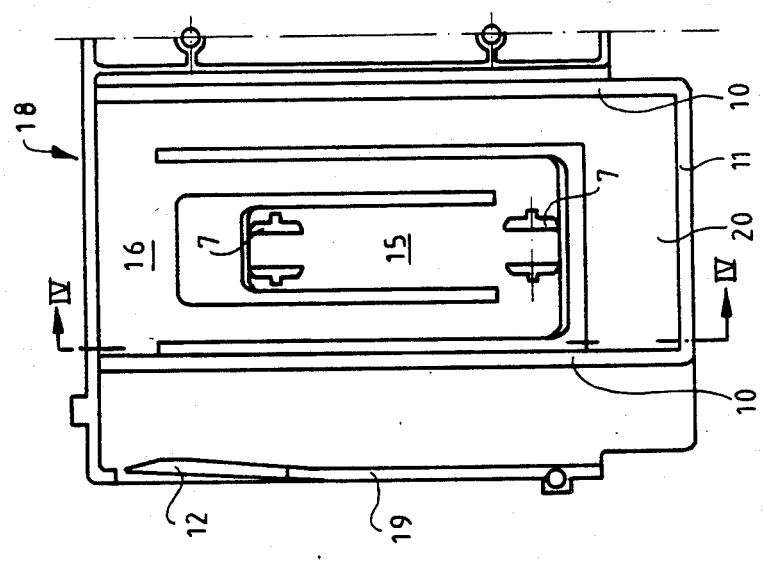
FIG. 3 is a bottom view of a leaf spring structure embodiment for retaining a cassette.

FIG. 3 shows another embodiment for the arrangement of the locking members 7. Again, there is provided a spring leaf 16 with a locking member 7 disposed at its end. Another locking member 7 adapted to engage the second reel hub opening of the cassette is arranged at the free end of a spring tongue 15 which is cut out of the spring leaf 16. This arrangement provides for independent engagement of the locking members 7 with the respective reel hubs so that both reels are safely locked in position and the cassette is firmly forced against its support thereby preventing any rattling.

Figure 4:
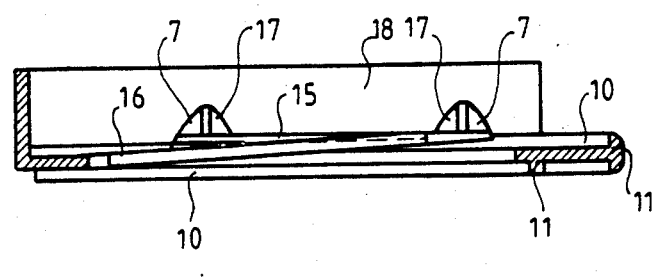
FIG. 4 is a cross-sectional view along line IV—IV of FIG. 3.

The sectional view of FIG. 4 also shows cam-like ribs 17 formed on the locking member 7 outer surface which ribs 17 project into the openings in the cassettes at the reel hubs and safely retain the cassettes in the correct position. Preferably, the height of the cam-like rib is slightly more than half the thickness of a cassette and the cam edges are arranged at an angle of about 50° relative to the plane of the spring leaf 16.

Figure 6:
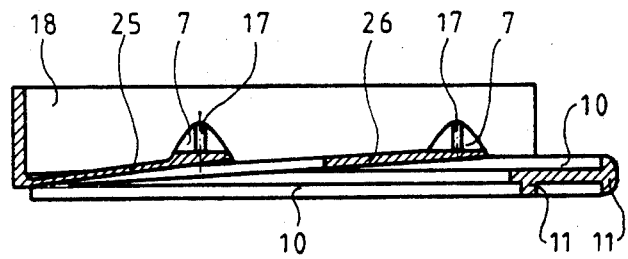
FIG. 6 is a cross-sectional view along line VI—VI of FIG. 5.
Figure 5:
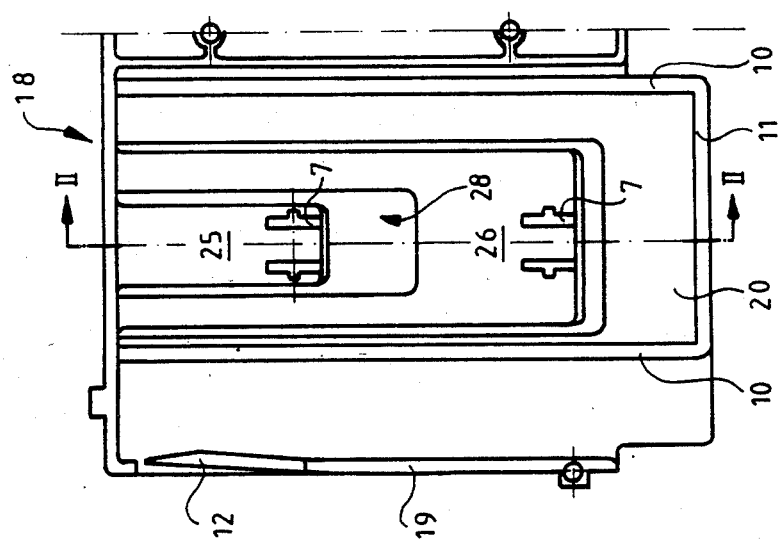
FIG. 5 shows another leaf spring structure embodiment.

Another embodiment is shown in FIGS. 5 and 6. Here again, a spring leaf 26 is provided with a locking member 7 arranged at its free end. The spring leaf 26 has a cutout 28 in which a resilient tongue 25 is disposed which also carries a locking member 7 at its free end, both the spring leaf 26 and the resilient tongue 25 projecting from the same end of the building element 18. The locking member 7 on the resilient tongue 25 is adapted to engage the hub of the rear cassette reel while the locking member 7 on the spring leaf 26 is adapted to engage the hub of the front reel of a cassette.

FIGS. 7 and 8 show still another embodiment for the arrangement of spring members 36. Here, inclined spring leaves arranged side-by-sdie project in opposite directions and at a given angle from opposite corner areas of a building element chamber such that the locking members 7 disposed at the free ends are in alignment in the direction of movement of a cassette into and out of the chambers. The operation and actions of the locking members 7 are of course the same as described earlier.

I claim:

1. A magazine for recording tape cassettes especially for use in vehicles, comprising a housing having a number of chambers, each for the reception of one cassette, each said chamber having an opening of a cross-section corresponding to the smaller cross-section of a tape cassette and adapted to receive such cassette lengthwise; said chambers being arranged horizontally and formed by drawer-like building elements stacked on top of one another and compressed within said cassette housing, one being disposed on top of each chamber, each of said building elements having at least one spring leaf cantilevered from each building element so as to extend essentially in the direction of movement of a cassette into, and out of, said chamber, said spring leaf having a free end movable relative to said chamber; a locking member supported at the free end of each spring leaf so as to project downwardly into said chamber for engagement with the hub opening of at least one of a tape cassette's reel hub openings, said locking member including a cam-like rib projection oriented also in the direction of movement of a cassette into, and out of, said chamber, said cam-like rib having cam-like edges adapted to cause the locking member to resiliently back up when a cassette portion is moved past them, each of said building elements having downwardly projecting side walls at opposite sides of said chambers with resilient guide straps disposed at one side thereof and projecting into said chamber and engaging herein any cassette inserted into said chamber so as to force said cassette into engagement also with the opposite wall of said chamber.

2. A magazine according to claim 1, wherein said drawer-like building elements are formed from plastic material.

3. A magazine according to claim 1, wherein each spring leaf is cantilevered at one end and has one locking member disposed at its free end so as to be adapted to engage one of the reels of said cassette and wherein a cantilevered spring tongue is formed from said spring leaf and has another locking member arranged at its free end and adapted to engage the other reel of said cassette.

4. A magazine according to claim 1, wherein two spring leaves are arranged side-by-side and cantilevered at opposite ends, the free end of said cantilevered spring leaves carrying locking members arranged as to project in the reel hub openings of a cassette inserted into a chamber, one of said spring leaves being cantilevered at the front end of said building element and the other at the rear end of said building element.

5. A magazine according to claim 1, wherein the height of said cam-like rib is slightly more than half the thickness of a cassette and the cam edges are arranged at an angle of about 50° relative to the plane of the spring leaf on which the locking member is disposed.

6. A magazine according to claim 1, wherein said locking members have two parallel cam plates spaced from one another such that the distance between their outside surfaces is slightly less than the reel hub opening diameter.

7. A magazine according to claim 6, wherein at least one of said cam ribs has a side rib formed thereon so as to extend normal with respect to the cam rib and the spring leaf, said side rib projecting from the cam rib so as to be snugly received in the respective reel hub opening.

8. A magazine according to claim 1, wherein slide strips are longitudinally arranged in said chambers on the chamber floors and extend parallel to the chamber's side walls, said strips having a height slightly larger than the projection of a tape cassette's window area such that a cassette is supported in said chamber solely on said slide strips.

9. A magazine according to claim 8, wherein, in a tape cassette insert-direction the slide strip arranged at the right-hand chamber side is sufficiently spaced from the right-hand chamber side wall to accummodate the tape cassette's thickened window area between the chambers right-hand side wall and said right side slide strip.

10. A magazine according to claim 1, wherein said drawer-like building elements each have two chambers arranged horizontally in side-by-side relationship, said chambers being separated from one another by spacing blocks which are recessed from the front end of said building elements, the side walls of said drawer-like building element also being recessed with respect to the building element's front end so as to facilitate grasping of a cassette disposed in a chamber.

11. A magazine according to claim 1, wherein foamed plastic sheets are arranged adjacent the bottom, top and side walls of said magazine such that they are engaged between the magazine housing walls and the building elements when stacked and compressed within said magazine housing in order to reduce rattling and absorb noises.

* * * * *